United States Patent
Preston et al.

(10) Patent No.: US 6,986,705 B2
(45) Date of Patent: Jan. 17, 2006

(54) POLISHING PAD AND METHOD OF MAKING SAME

(75) Inventors: Spencer Preston, Manteca, CA (US); Doug Hutchins, Riverbank, CA (US); Steve Hymes, Briarcliff, TX (US)

(73) Assignee: RimPad Tech Ltd., Austin, TX (US)

( * ) Notice: Subject to any disclaimer, the term of this patent is extended or adjusted under 35 U.S.C. 154(b) by 0 days.

(21) Appl. No.: 10/818,627

(22) Filed: Apr. 5, 2004

(65) Prior Publication Data

US 2005/0218548 A1 Oct. 6, 2005

(51) Int. Cl.
*B24D 11/00* (2006.01)

(52) U.S. Cl. .......................... 451/526; 451/41; 451/59; 451/528; 451/529; 451/534; 451/539

(58) Field of Classification Search ................. 451/41, 451/59, 526, 528, 529, 534, 539
See application file for complete search history.

(56) References Cited

U.S. PATENT DOCUMENTS

| | | |
|---|---|---|
| 3,491,032 A | 1/1970 | Skochdopole et al. |
| 4,927,432 A | 5/1990 | Budinger et al. |
| 5,116,881 A | 5/1992 | Park et al. |
| 5,209,760 A | 5/1993 | Wiand |
| 5,489,233 A | 2/1996 | Cook et al. |
| 5,578,362 A | 11/1996 | Reinhardt et al. |
| 5,900,164 A | 5/1999 | Budinger et al. |
| 6,325,703 B2 | 12/2001 | Cook et al. |
| 6,434,989 B1 | 8/2002 | Hardtke |
| 6,641,471 B1 | 11/2003 | Pinheiro et al. |
| 6,648,733 B2 * | 11/2003 | Roberts et al. ............... 451/41 |
| 6,837,781 B2 * | 1/2005 | Hishiki ....................... 451/527 |
| 2003/0109209 A1 | 6/2003 | Hishiki |

* cited by examiner

*Primary Examiner*—Lee D. Wilson
*Assistant Examiner*—Shantese McDonald
(74) *Attorney, Agent, or Firm*—Snell & Wilmer L.L.P.

(57) ABSTRACT

An article or polishing pad for altering a surface of a work piece includes a polymer matrix created by reaction injection molding of size controlled gas bubbles within a polyurethane matrix. The proposed liquid urethane precursor is first injected into an actuated mold and cured. The molded product is then removed from the mold and double side faced or ground to form a single thin polishing pad comprising a single layer of homogeneous material.

32 Claims, 5 Drawing Sheets

POLISHING PAD AND METHOD OF MAKING SAME

FIELD OF INVENTION

The present invention generally relates to polishing pads used for creating a smooth, planar surface on a wide range of items such as glass, semiconductors, plastics and polymers, metals, dielectrics, and magnetic materials. More particularly, the present invention relates to the bulk structure of those pads and methods of making and using the same. The present invention also relates to an article of manufacture that is especially useful for polishing or planarizing a surface such as those used in manufacturing integrated circuits and MEM devices. In addition, the present invention is especially useful for polishing or planarizing metals and dielectrics such as those used in interconnect structures in integrated circuit devices such as semiconductor wafers containing copper damascene and dual damascene features.

BACKGROUND OF THE INVENTION

In the fabrication of optics, magnetic disks, micromachines, and particularly semiconductor integrated circuit devices, there is a desire to perform chemical mechanical planarization (CMP) operations. Specifically, integrated circuits are fabricated in the form of multi-level structures on semiconductor wafer substrates. At the substrate level, transistor devices having diffusion regions are formed. In subsequent levels, interconnect metallization lines are patterned and electrically connected to the transistor devices to define the desired functional device. As is well known, patterned conductive layers are insulated from other conductive layers by dielectric materials, such as silicon dioxide. Traditionally, suitable metal films included aluminum and its alloy as well as tungsten and the associated barrier and liner films for each. More recently, Cu metallization along with its associated barrier, liner and passivation films has emerged and is rapidly becoming the conductor of choice for advanced device fabrication. Similarly, insulating materials have evolved with traditional silicon dioxide taking a back seat to more advanced materials with lower dielectric permittivity. A dominant trend within this technology advancement is the migration to smaller and smaller transistor features and the more extensive layer stacking of multilevel metallization required to connect to a more highly packed transistor plane.

As the device side shrinks, the lithography requirement as well as the requirements of many of the other process steps becomes more stringent. The ability to create more metallization levels and associated dielectric layers requires increasingly more planar surfaces. Without planarization, fabrication of further metallization layers becomes substantially more difficult due to the variations in the surface topography. CMP has emerged as a dominant planarization process for advanced microelectronics and is used for both the planarization of metal and dielectric layers. Furthermore, the in-laid metal Damascene approach, which has been accomplished in large part due to the CMP process, has been a dominant approach to form interconnect structures and to enable improved circuit performance, fabrication line manufacturability and process line and device yields.

CMP has the capability to achieve significant planarization efficiency across many orders of magnitude length scale. In the most advanced wafer-scale technologies, wafers 300 mm in diameter are polished. The planarization that is achieved at this length scale is generally termed the 'within-wafer-nonuniformity' or 'across-wafer-nonuniformity'. At the opposite end of the spectrum, CMP must provide planarization capability at the atomic scale or Angstrom length-scale, and is generally termed 'surface roughness'. Intermediate length scale performance is also required. Thus, planarization must be achieved across many orders of magnitude length scale and CMP has emerged as the dominant technique in this regard.

A chemical mechanical planarization (CMP) system is typically utilized to polish a wafer as described above. A CMP system typically includes system components for handling and polishing the surface of a wafer. More advanced systems also include modules to perform post-CMP cleaning of the wafer surfaces. In the CMP Process, a wafer is typically pressed against a polishing surface (polishing pad) in the presence of a steadily supplied polishing liquid and the lateral motion of a polishing surface relative to wafer surface imparts mechanical energy which in combination with the chemical nature of the liquid, acts to effect surface removal. CMP equipment designs have incorporated rotary, orbital as well as linear system motions. Machine configurations leveraging other motions are viable as well. A well engineered CMP process leverages the consumables (pad, slurry, etc.) and process recipes on a particular platform to achieve an overall CMP process. Application of this process achieves the preferential removal of protruding surface features and the preferential nonremoval of recessed features and in this way surface smoothing and planarization is achieved. The relative extent of removal of protruding vs. recessed features determines the planarization efficiency.

The polishing liquid referenced above is typically loaded with abrasive and in such cases is termed slurry. In the absence of any abrasive, the polishing liquid has also been termed either simply a reactive liquid or an abrasive-free slurry. In general, the slurry can be viewed as a polishing liquid in which a chemical mixture is loaded with an amount of abrasive. The chemical mixture can include a wide range of chemical components including, but not limited to, chemical ligands, chelating and complexing agents, corrosion inhibitors, pH adjusting acids and bases, pH buffers and surfactants. Abrasives can be made of a wide range of materials, formed from a wide range of processes and incorporated over a wide range of content including, but not limited to, organic particles and inorganic particles, such as $SiO_2$, $TiO_2$, and $Al_2O_3$ formed by fuming or solution growth from well below 0.1% to above 40% by weight. In general, it is desirable to maintain the abrasive as a colloidal suspension to improve defectivity and minimize slurry handling issues.

The polishing article is typically called a polishing pad. Such components can be, for example, an orbital polishing pad, or a linear belt polishing pad. The pad material itself is typically based upon polyurethane; though a wide range of other pad materials are viable. Both open and close microcellular pads, noncellular pads, fiber pads of both woven and nonwoven construction, filled pads employing embedded abrasive, and coated pads with ceramic surface layers, have all been applied in semiconductor CMP processing. Important pad characteristics which influence CMP performance include, but are not limited to, material composition and micro structure, surface macro, micro and nanotexture, pad layer stacking, pad material properties including mechanical properties of hardness, elastic, inelastic and anelastic behavior, and surface tension.

As a result of the pad and slurry consumables used and the process parameters employed in CMP processes, a phenomenon known as 'glazing' occurs in which the process performance drifts as a result of an inherent instability of the process. Typically, the material removal rate and associated across wafer rate uniformity drift outside desired ranges. Both slurry and slurry by-products become embedded within the pad and the pad material itself changes as a result of the mechanical and chemical influences. For certain fibrous pads, the napth of the pad may need refreshing. For other pads, the actual pad material may experience plastic deformation. In order to achieve a consistent surface quality, surface dressing is required. This is typically called 'conditioning' and is usually achieved by either raising the surface with an inert plastic brush or removing surface material via abrasive by a bound hard particle disk. In some cases, chemical treatment in the absence of mechanical dressing is used. The particular approach generally depends on the origin of the issue and the type of polishing pad.

FIG. 1 shows a cross sectional view of a dielectric layer undergoing a fabrication process that is common in constructing Damascene and dual-Damascene interconnects. The dielectric layer has a diffusion barrier/adhesion promotion layer (typically layers of TiN, Ta or TaN) deposited over the etch-patterned surface of the dielectric layer. Once the diffusion barrier layer has been deposited to the desired thickness, a copper layer is formed over the diffusion barrier layer in a way that fills the etched features in the dielectric layer. Some excessive diffusion barrier and metallization material is also inevitably deposited over the field areas. In order to remove these overburden materials and to define the desired interconnect metallization lines and associated vias (not shown), a chemical mechanical planarization (CMP) operation is performed.

As mentioned above, the metal CMP operation is designed to remove the top metallization material from over the dielectric layer. For instance, as shown in FIG. 2, the overburden portions of the copper layer and the diffusion barrier layer have been removed. As is common in CMP operations, the CMP operation must continue until all of the overburden metallization and diffusion barrier material is removed from over the dielectric layer. The greater the planarization efficiency of the metal CMP process, the less metal needs to be deposited, and the more efficiently a fully planar surface can be achieved. Depending on the slurry or slurries used, the copper and barrier film removal may occur using a single slurry with one or more process steps, or may be performed using slurries targeted for each layer in multiple steps. Due to the inherent across wafer and within die pattern dependent thickness variation associated with the deposition process, a given location on the wafer will clear first while another location will be the last to clear. As the goal is to remove all metal in the field region across the entire wafer (though minimize removal in the trench region), the portion of the wafer to first clear will receive relatively more overpolish than that portion of the wafer which is last to clear. This is termed overpolish. A more efficient planarization process can minimize the extent to which one portion of a die clears before another. Similarly, the greater the ability of the CMP process to minimize the induced topography during such overpolish, while maintaining suitable performance in the vast array of other metrics, the better the overall process performance.

Clearly, optimization of a CMP process is multifaceted. The process capability, stability and manufacturability all must be met. Within capability, both topography and defectivity are paramount. Having better pads increases the margin by improving the efficiency of planarizing and lowers the susceptibility to topography generation during overpolish. Stability with respect to pad amounts to pad life. Manufacturability with respect to the pad amounts to the cost of the pad as a consumable, which is related to pad stability via pad life, as well as process capability in terms of process line yield limitations due to associated pad contribution to process capability.

As indicated above, polishing pads for CMP applications can be classified into a number of categories. Fibrous pads have found commercial application in semiconductor applications. Such pads may consist of woven or nonwoven fibers. Additionally, the fibers may have applied coatings. An example of an impregnated fiber pad is the Rodel Politex, Rodel Suba series and the Thomas West pad (Kanebo). Fiber pads may even consist of voided regions as the coating on the fibers impinges on one another. An example of a pad using a hard coating is the recent offerings by PsiloQuest Inc, which uses a hard ceramic coating on an otherwise softer cellular substrate. An example of a filled pad is the 3M fixed-abrasive pad which has embedded ceramic particles. Such a pad is typically used with an abrasive-free reactive liquid, where the pad itself contributed the abrasive particle to the system, in contrast to slurry-based approaches in which the abrasive is suspended in the liquid chemistry. The pad is also made in a roll format. The prior art also discusses fully solid polymeric pad in Rodel U.S. Pat. No. 5,489,233 by Cook et al. In this single pad manufacturing approach, there is no internal void space and no intrinsic ability to either absorb or transport slurry.

There are a number of patents which address pads that do not constitute completely solid materials. These cellular pads include both open and closed cell forms. Cell size is an important pad characteristic in that it acts as a vehicle to absorb and transport slurry. While such pores are susceptible to plastic deformation and glazing as mentioned above, efficient replenishment of the surface can be achieved through abrasion of the surface material to yield new cells. With smaller cells, this replenishment can occur more frequently and efficiently, thus providing for a more stable CMP process and longer pad life.

A dominant issue within such art is the ability to control cell size. An example of the open cell structure is presented in Rodel U.S. Pat. No. 6,325,703 by Cook et al. The interconnectivity of an open cell structure allows for significant slurry and slurry by-product absorption, but generally requires an underlying layer to act as a moisture barrier and maintain adhesion integrity to the polishing platform. There are a number of closed cell formation approaches available in the prior art. Rodel U.S. Pat. Nos. 6,434,989, 5,900,164 and 5,578,362 by Reinhardt et al present closed cell materials through the use of incorporated polymeric microelements. In this cured and sliced cake approach, the incorporated microelements provide an exposed open void during use upon either direct mechanical shearing through the element during conditioning or through dissolution of the element shell during contact with the aqueous polishing liquid. The size of the microelements and the degree to which they coalesce directly translates to the effective closed cell size of the pad material. Other incomplete solid materials have been proposed as well. Polyurethane processed through water blown formation techniques are some of the earliest pad materials used for CMP processing. In this case, urethane reaction by-products include urea and $CO_2$ gas, which becomes trapped within the viscous and curing urethane material. The drawback of such processing stems from the violent exothermic reaction and the limited control over this process. The Universal Photonics approach is some of the earliest work in which the uncontrolled reaction leads to a wide cell size distribution. Average cell sizes are typically 50 um diameter and above and include a significant tail in the distribution to very large cell size, in some cases leading to macroscopic holes in the pad. The Toray process cures the polyurethane under pressure at room temperature in an attempt to control cell size, but the resulting cell size is still large. The Poval process uses a very large closed container system, which is again cured from the inside out, with large cell size and wide size distribution resulting from the poorly controlled reaction release of $CO_2$. In contrast to the water blown systems, JSR has incorporated water soluble fillers which, upon dissolution, give rise to a voided cellular structure.

Cell size formation can also be accomplished through direct gas injection into the polymeric materials. U.S. Pat. No. 3,491,032 (Skochdopole et al.; Jan. 20, 1970) describes a process for making cellular polymer materials. In a process of Skochdopole, finely divided solid materials such as calcium silicate, zinc stearate, magnesium stearate and the like can advantageously be incorporated with the polymer or gel prior to expanding the same. Such finely divided materials aid in controlling the size of the cells, and are employed in amounts of from about 0.01% to about 2.0% by weight of the polymer.

U.S. Pat. No. 5,116,881, issued to Park et al. on May 26, 1992, describes polypropylene foam sheets and a process for their manufacture. In a process of Park, a nucleating agent, is used to create sites for bubble initiation. It is preferred that the nucleating agent have a particle size in the range of 0.3 to 5.0 microns and that its concentration be less than one part per hundred parts polymer by weight. Concentrations of nucleating agents greater than five parts per hundred parts polymer by weight leads to agglomeration, or insufficient dispersion of nucleating substance so that the diameter of the cell size becomes greater.

Rogers Inouac and others mention dissolving gas into the liquid polymers under high pressure. This gas is susceptible to coming out of solution as a result of a pressure drop. The gas takes the form of bubbles.

In addition to cell size formation and control, a wide range of pad design attributes have also been addressed in the prior art including composition, pad flatness, texture, grooving, layer stacking, and porosity (distinguished from microcells). A number of issues feed into pad stability and include the chemical integrity of the material as a result of its direct exposure to the polishing liquid (moisture absorption, chemical reactions), pad material curing at room temperature, mechanical property issues such as elasticity, plasticity, anelasticity and associated glazing response.

The prior art teaches a wide range of material compositions for polishing pads which include at least one moiety from the following: a urethane; a carbonate; an amide; an ester; an ether; an acrylate; a methacrylate; an acrylic acid; a methacrylic acid; a sulphone; an acrylamide; a halide; an imide; a carboxyl; a carbonyl; an amino; an aldehydric and a hydroxyl.

U.S. Pat. No. 6,641,471 owned by Rodel states that slurry distribution is related to, and is conceivably required or assisted by, friction between the semiconductor and the wafer. It specifically states "Slurry is most usually introduced onto a moving preparation surface, e.g., belt, pad, brush, and the like, and distributed over the preparation surface as well as the surface of the semiconductor wafer being buffed, polished, or otherwise prepared by the CMP process. The distribution is generally accomplished by a combination of the movement of the preparation surface, the movement of the semiconductor wafer and the friction created between the semiconductor wafer and the preparation surface." However, the importance of controlling friction and surface friction to maintain integrity of the target films, particularly those comprising low k dielectrics which may be porous and extremely fragile, is not addressed. Research investigating the roll of the coefficient of friction (COF) has been performed and published by others, but they do not specifically target low COF processing, nor do they explicitly link such work to targeting low COF pad materials surfaces nor do they propose either micropores or the combination of low COF with micropores to achieve low friction during processing to avoid interfilm and intrafilm failure issues which occur during the polishing process, particularly in the regime of low k dielectrics. Tightly packed micropores act to minimize surface contact area. They also immediately provide local slurry supply and thus limit frictional effects and ameliorate excursive contact effects which can result in intrafilm and interfilm failures. By lowering the friction effects, a lower surface temperature can be achieved and the isotropic chemical etching component can be minimized, thereby increasing planarization efficiency.

The prior art also teaches many embodiments of surface texture. In most cases, the surface texture of the polish pad stems from an intrinsic microtexture as a result of its method of manufacture. The surface microtexture is derived from bulk non-uniformities which are deliberately introduced during manufacture of the pad. When cross-sectioned, abraded, or otherwise exposed, the bulk texture becomes a surface microtexture. This microtexture, which is present prior to use, permits the absorption and transport of slurry particles, and gives rise to polishing activity without further addition of micro- or macrotexture to the pad. Examples of such an approach include urethane impregnated polyester felts (examples of which are described in U.S. Pat. No. 4,927,432) in which the microtexture is derived from the ends of projecting fibers within the bulk composite, together with associated voids. Microporous urethane pads of the type sold as Politex by Rodel, Inc. of Newark, Del. have a surface texture derived from the ends of columnar void structures within the bulk of a urethane film which is grown on a urethane felt base. Filled and/or blown composite urethanes such as IC-series, MH-series and LP-series polishing pads manufactured by Rodel, Inc. of Newark, Del. have a surface structure made up of semicircular depressions derived from the cross-section of exposed hollow spherical elements or incorporated gas bubbles. Abrasive-filled polymeric pads such as those of U.S. Pat. No. 5,209,760 possess a characteristic surface texture consisting of projections and recesses where filler grains are present or absent. In yet another case, the surface microtexture is not introduced as a method of manufacture and is a result of in-situ generation during the CMP process. An example of such an approach is the OXP pad by Rodel. "Macrotextures", or larger size textured artifacts including grooves, may be imposed on the work surface of a pad by embossing, skiving, perforating and/or machining, for example. In conventional polishing pads, the spacing and/or size of individual macrotexture artifacts or features is generally greater than 5 mm. The spacing and size of these artifacts are typically very regular and repetitive but more complex fractal patterns have been proposed.

The prior art reveals that pore size control is an important characteristics for most, if not all, pads. For those pads which do not have an intrinsic surface texture as a result of pad microstructure, nor induced macrostructure or grooves as a result of the pad manufacturing process, a microstructure is induced as part of the polishing system. While microcell creation has been achieved through multiple methods, the absolute average cell size has been generally limited to well above 10 microns, and the size distribution has been quite broad. A technique which allows for smaller cell size and tighter size control is warranted. The incorporation of microelements has allowed for reasonable cell size distribution, but at a larger average cell size than desirable. Additionally, cell size creation though microelements or microspheres which dissolves in aqueous environments, leaves a polish pad and process susceptible to pad by-product induced defectivity. A pad material, and process for manufacturing such, which provides for more uniform cell size and smaller cell size, which does not utilize the incorporation of a foreign material is desirable.

The present invention is directed to a polishing pad, and method of make the same, which provides for the incorporation of small uniform gas bubbles of controlled size and shape through a novel gas injection technique leveraged to an actuated reaction injection molding process. The improved process includes producing a molded microcellular elastomer with a reduced number of voids from at least two liquid reactants and a gas. The process includes introducing into at least one reactant a gas to form an admixture; passing the admixture through a static mixer at superatmospheric pressure; then immediately mixing the admixture with the other reactant at superatmospheric pressure to form a reaction mixture; introducing the reaction mixture into a mold in which the pressure is substantially below the superatmospheric pressures used above; and curing the reaction mixture in a mold to produce a molded microcellular elastomer with a reduced number of large voids.

SUMMARY OF THE INVENTION

The present invention provides a polishing pad and method for making a polishing pad where shear forces are applied to control the cell size contained in the pad. The polishing pad is formed by a reaction injection molding (RIM) method where gas is mixed with a polymeric resin component prior to adding an isocyanate component.

In accordance with one exemplary embodiment of the invention, a polishing pad having uniform microcellular size is produced by introducing a gas into a polymeric resin contained in a pressurized tank, pumping the polymeric resin and gas mixture through a fine porosity stone mixer, mixing the polymeric resin and gas mixture with an isocyanate to form a resulting mixture, and injecting the resulting mixture into a mold. In another exemplary embodiment of the invention, the gas is introduced into the polymeric resin through a sparging tube. In yet another exemplary embodiment of the invention, the polymeric resin and gas mixture may be passed through an emulsifier and/or a homogenizing mixer after being pumped through the fine stone porosity mixer.

In still another exemplary embodiment of the invention, the polymeric resin and gas mixture is forced through a high shear cavitation device which functions as yet another shearing application that causes the material to vaporize. High pressure drops are created which induces shearing. The high shear cavitation device may replace any of the other shearing applications, namely, sparging, the fine porosity stone mixer, the emulsifier, the homogenizing mixer, and any others, but may also be used in addition to these shearing applications to further control the size and uniformity of the cells contained within the resulting polishing pad. The high shear cavitation device does not require the separate use of a gas but may be used with the separate introduction of gas.

The polymeric resin component includes a catalyst and is retained in a pressurized tank which may or may not contain a sparging tube for the introduction of the gas. Means for introducing the gas into the pressurized tank other than through a sparging tube may also be used. The polymeric resin and gas mixture are recirculated through the pressurized tank and the fine porosity stone mixer prior to mixing the isocyanate into the polymeric resin and gas mixture.

The resulting pad has a uniform microcellular structure with an average cell diameter preferably within a range of about 0.05 to 100 micrometers, and more preferably within a range of about 0.05 to 30 micrometers. The surface material of the pad has a low coefficient of friction, preferably a coefficient of friction less than 0.4.

In accordance with another aspect of the invention, a surfactant and/or an ultraviolet stabilizer may be added to control the surface tension of the pad and/or control the shelf life of the pad, respectively.

In still another exemplary embodiment of the invention, a polishing pad having uniform microcellular size is produced by introducing a gas into a polymeric resin through a recirculating pump which pumps the polymeric resin and gas mixture through a fine porosity stone mixer, mixing the polymeric resin and gas mixture with an isocyanate to form a resulting mixture, and injecting the resulting mixture into a mold. In yet another exemplary embodiment of the invention, the polymeric resin and gas mixture may be passed through an emulsifier and/or a homogenizing mixer after being pumped through the fine stone porosity mixer to further control the uniformity and microcellular size of the pad.

As in the previously described exemplary embodiment, the polymeric resin and gas mixture may be forced through a high shear cavitation device which functions as yet another shearing application that causes the material to vaporize. High pressure drops are created which induces shearing. As previously stated, the high shear cavitation device may replace any of the other shearing applications, namely, sparging, the fine porosity stone mixer, the emulsifier, the homogenizing mixer, and any others, but may also be used in addition to these shearing applications to further control the size and uniformity of the cells contained within the resulting polishing pad. The high shear cavitation device does not require the use of a gas but may be used with the introduction of a gas.

In accordance with a further aspect of the invention, a method for making a polishing pad of uniform microcellular size is provided where the average cell size of the polishing pad is controlled by applying a plurality of shearing forces to the polymeric resin and gas mixture described above, prior to adding the isocyanate component. In accordance with a still further aspect of the invention, a window may be formed within the polishing pad to assist in end point detection. The window may be formed by removing a portion of the polishing pad and filling the opening created by the removed portion with either a liquid polymer material that solidifies as a transparent or translucent portion, or a solid transparent or translucent portion that is bonded to the pad. In addition, any other means known in the art for forming a window within a polishing pad may be used in accordance with the present invention.

In accordance with yet another aspect of the method of the present invention for making a polishing pad, the resulting mixture containing the polymeric resin and gas and the isocyanate are injected into an actuated mold as part of a reaction injection molding process. The resulting pad formed from the mold may then undergo grinding or facing on at least one of its sides, and grooves may also be machined into the surface of the pad.

Superior uniformity and planarity are achieved when performing chemical mechanical polishing with the polishing pad of the present invention.

BRIEF DESCRIPTION OF THE DRAWINGS

The subject invention will hereinafter be described in the context of the appended drawing figures, wherein like numerals denote like elements, and.

DETAILED DESCRIPTION

Figure 1:
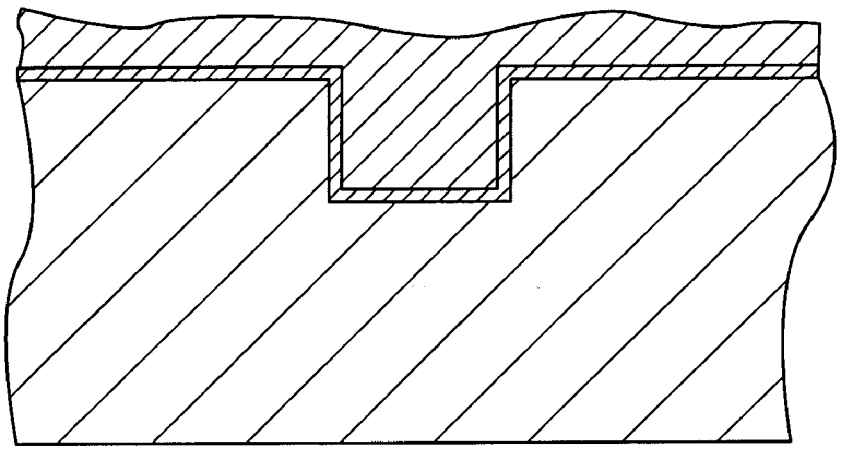
FIGS. 1 and 2 show an exemplary cross sectional view of a dielectric layer undergoing a fabrication process that is common in constructing damascene and dual-damascene interconnects.
Figure 2:
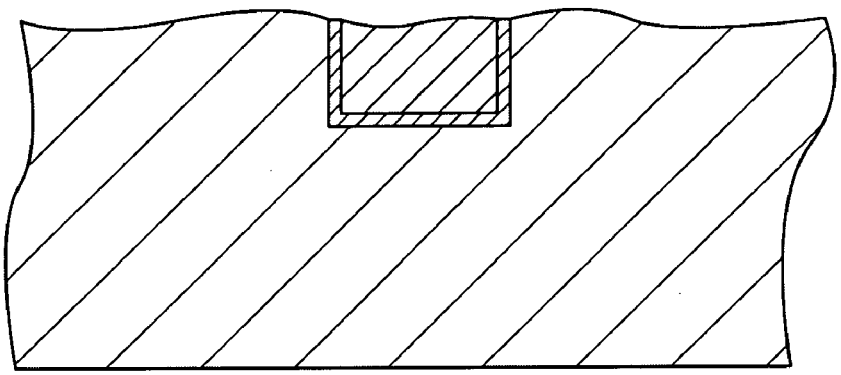

The present invention is directed to a nonporous, uniform microcellular polishing pad having an average cell diameter that is preferably within a range of about 0.05 to 100 micrometers and more preferably within a range of about 0.05 to 30 micrometers. The surface material of the pad possesses a low coefficient of friction with a coefficient of friction preferably less than 0.4. The polishing article of the present invention preferably comprises a generally circular sheet or polishing pad. However, one of ordinary skill in the art would understand that the pad may, for example, be generally square, rectangular or of any suitable shape desired and may also be supplied in roll format in which only a portion of the pad is used at any given time.

The polishing article of the present invention may be used as a polishing pad either by itself or as a substrate in a polishing operation in which polishing slurry is used to provide a desired surface finish for semiconductor devices, silicon devices, crystals, glass, ceramics, polymeric plastic material, metal, stone, or other surfaces. The polishing pad of the present invention may be used with polishing liquids, all well known to those skilled in the art and readily available commercially. The working environment of the article comprises the environment surrounding the article when in use, including the substrate to be polished and the polishing slurry or liquid.

The polishing pad of the present invention is useful for altering the surface of a workpiece by a polishing operation, such as lapping, planarizing, grinding, and shaping. The workpiece may be a semiconductor device having multiple layers of polysilicon, thermal oxides, and metallic materials, each layer of which may be planarized before a subsequent layer is deposited.

The polishing pad comprises a polymeric matrix which is preferably impermeable (and therefore, not porous) to aqueous fluid slurries typically used in polishing and planarization operations. The polymeric matrix may be formed from urethanes, melamines, polyesters, polysulfones, polyvinyl acetates, fluoronated hydrocarbons, and the like, and mixtures, copolymers and grafts thereof. One of ordinary skill in the art will appreciate that any other polymer may be used that has sufficient toughness and rigidity to resist extensive wear during polishing operations. With respect to the present invention, the polymeric matrix preferably comprises a urethane polymer.

For purposes of describing the present invention, the following terms will have the following general meanings:

nonporous: a material characteristic in which macroscopic sized voids exist within the material, typically a result of highly uncontrolled material reactions. Occurs often in poorly controlled water blown urethanes due to the highly reactive nature of water with the isocyanate.

microcell: a material characteristic in which microscopic sized voids exist within the material, typically a result of highly controlled material reactions targeting an incorporated void structure.

air pockets: a characteristic of resulting material form (not really the material itself) in which air is trapped within the molding process causing large voided regions. These are typically larger than the macroscopic voids associatied with the nonporous definition.

nucleated: a material which has the presence of intentionally incorporated gas closed cell membrane: a material which contains microcell structures (as defined above) wherein the incorporated voids are essentially discrete and most particularly highly unconnected to each other, so as to avoid a continuous path for liquid incorporation into the bulk of the material (as opposed to only the surface layer).

Figure 3:
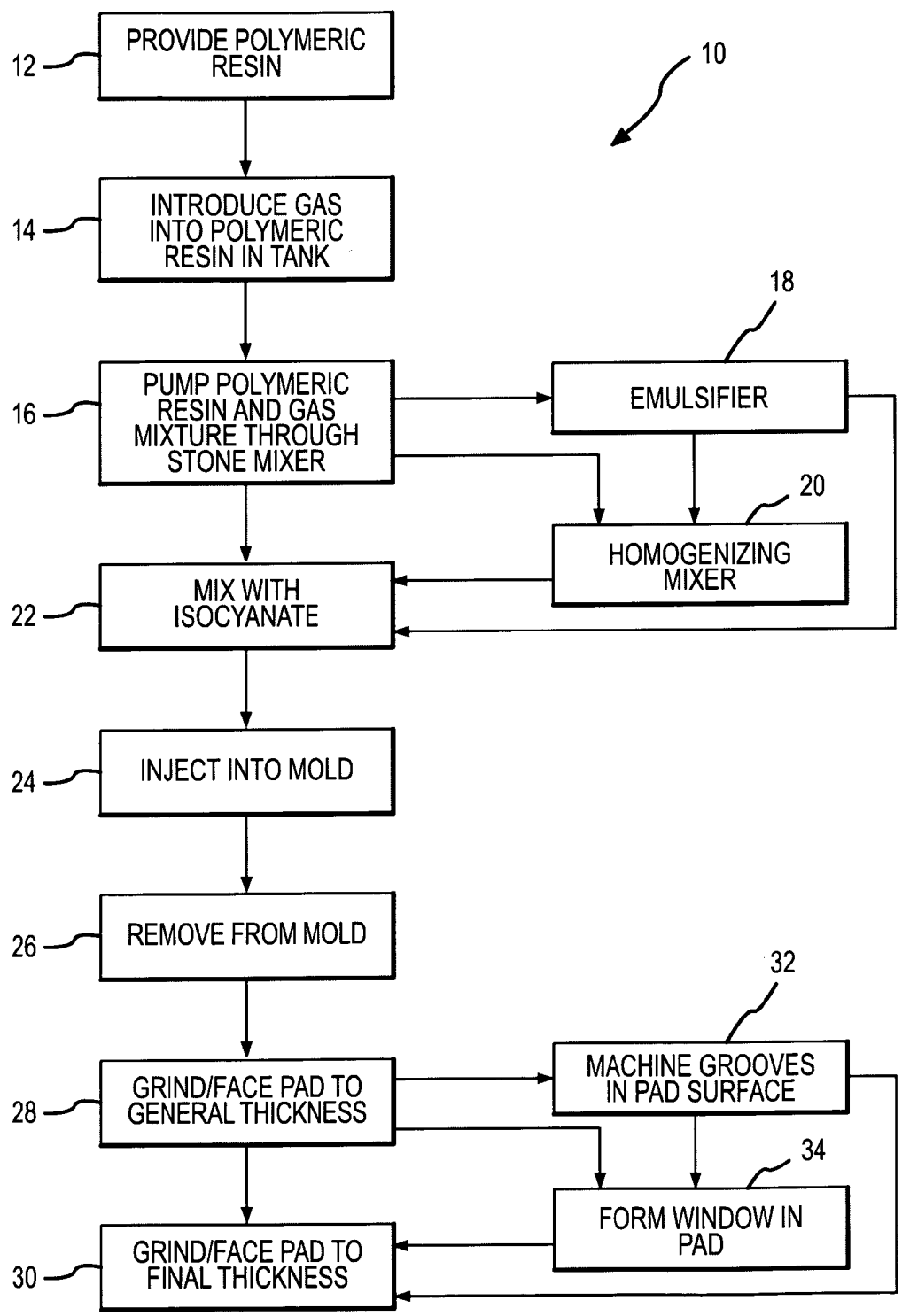
FIG. 3 is a flowchart showing one exemplary embodiment of a method for making the polishing pad of the present invention.

Turning now to the figures, FIG. 3 is a flowchart showing one exemplary embodiment of a method 10 for making the polishing pad of the present invention. First, a polymeric resin component is provided in step 12 and a gas is introduced into the polymeric resin contained in the pressurized tank in step 14. The gas may be introduced into the polymeric resin contained in the pressurized tank in any number of ways with one exemplary means of introduction being by way of a sparging tube contained within the tank. The polymeric resin component includes a catalyst and preferably comprises a polyether-based liquid urethane such as that used in the Bayflex line of products which are commercially available from Bayer Polymers of the Bayer Group located in Leverkusen, Germany. Bayer's Bayflex line includes a two part liquid polyurethane system which comprises a first polmeric resin component containing a catalyst and a second isocyanate component. Bayer's Bayflex polyurethane resin blend includes a glycol catalyst which provides for a slower reaction rate compared to many other conventional reaction injection mold (RIM) catalysts such as amines. The slower reaction rate associated with glycol allows sufficient time for the product to flow and fill the molds prior to gelling and solidifying.

Many other prepolymers containing catalysts may be used for the first polmeric resin component. Examples of such prepolymers include, but are not limited to, polyurethane, polyether polyols, polymer polyols, aliphatic polyester polyols, aromatic polyester polyols, polytetramethylene ether glycol (PTMEG), PTFH, castor oil based polyols, polycaprolactone polyols, hydroxyl terminated polybutadiene (HTPB), acrylic polyols, and polyamines.

The gas introduced into the polymeric resin component in step 14 may be a an inert gas, a reactive gas, a reductive gas, or some combination thereof. In a preferred embodiment, the gas is a dry inert gas such as air, Ar, $N_2$, or $O_2$, or a partially reductive or scavenging gas mixture such as 3% $H_2$/Ar. Other mixtures of gas which do not interfere with the urethane chemistry may also be used such as, for example, mixtures of reactive gas with inert gas, inert gas with inert gas, reactive gas with reactive gas, inert gas with reductive gas, reactive gas with reductive gas, and reductive gas with reductive gas. It will be appreciated by those skilled in the art that a variety of other prepolymers and gases may be used in accordance with the present invention.

In step 16, the polymeric resin and gas mixture are pumped through a fine porosity stone mixer to apply a shearing force which controls the cell size of the polishing pad when using reaction injection molding. Alternatively, additional shearing forces may be applied by pumping the polymeric resin and gas mixture through an emulsifier in step 18 and/or a homogenizing mixer in step 20 after pumping the mixture through the fine porosity stone mixer in step 16. The shearing forces function to break down the gas bubbles that are introduced into the polymeric resin. Pumping the polymeric resin and gas mixture through one or both of the emulsifier and homogenizing mixer after the fine porosity stone mixer enables further control of the average cell size of the pad (by achieving smaller cell size distribution) and facilitates increased uniformity of the cell size.

After applying shearing forces in steps 16, 18 and 20, the polymeric resin and gas mixture is mixed with an isocyanate component in step 22. Many types of isocyanate may be used with diphenylmethane diisocyanate (MDI) being a preferred choice. Others that may be used include, but are not limited to, toluene diisocyanate (TDI), aliphatic isocyanates, blocked isocyanates, modified isocyanates, and prepolymers.

The resulting mixture of polymeric resin, gas and isocyanate is then injected into a mold, preferably an actuated mold, in step 24. After the molding process is complete, the article (polishing pad) is removed from the mold in step 26 and at least one surface of the pad may be ground or faced to a generally desired thickness in step 28 such as, for example, 50–100 thousandths of an inch. At this point, the polishing pad may undergo another grinding or facing to a final thickness as shown in step 30, or may undergo one or more steps prior to grinding or facing to a final thickness. For example, grooves may be machined into a surface of the polishing pad as shown in step 32 or a window may be formed within the polishing pad as shown in step 34.

In step 32, grooves are machined on a working surface of the polishing pad. The grooves may be of various common types such as concentric, hatching, x-y, and/or the like and the various sizes of the grooves may be cut into the pad surface. For example, the polishing pad may be cut to form grooves thirty thousandths of an inch thick in the surface of the pad. The pad is also formed or cut to a desired diameter by any number of means including, but not limited to, machining, lathing, water cutting, etc. The polishing pad of the present invention does not include any type of fractal pattern of artifacts or any textures on the pad surface. Instead, the polishing pad of the present invention uses typical patterns such as x-y patterns, concentric circles, spirals, and the like. If a window is also added to the pad as shown in step 34, the grooves may be isolated when formed so that they do not interfere with the placement of the clear optical window.

In step 34, a window is added to the polishing pad by removing a portion of the pad and filling the opening created by the removed portion with a polyurethane material that is different in formulation from the pad material. For example, a polycarbonate or other suitable material could be used as a liquid which bonds to the main pad and solidifies as a transparent or translucent portion of the pad. In another window embodiment, a solid window portion is set in the opening created by the removed portion and then bonded to the main pad. As a result, a distinct boundary is formed between the pad and the window. No grooves are cut on the window but the pad may still be ground or faced to a final thickness in step 30. The pad may also be ground or faced to a final thickness in step 30 when only grooves are formed in the pad. Finally, the pad is cleaned and packaged for delivery.

Figure 4:
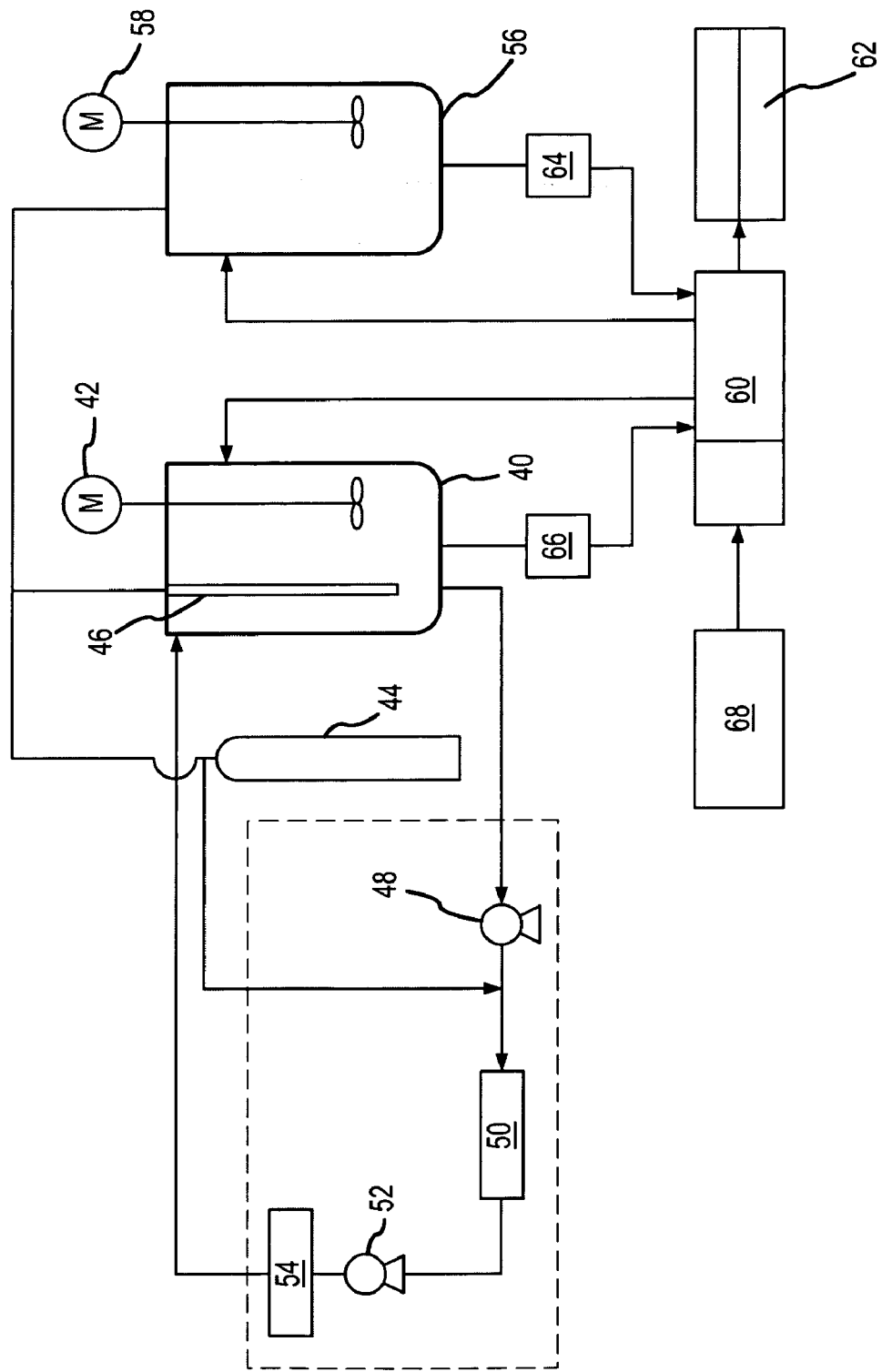
FIG. 4 is a schematic view of the manufacturing equipment used to produce the polishing pad in accordance with the method shown in FIG. 3.

A schematic view of the manufacturing equipment used to produce the polishing pad in accordance with the method shown in FIG. 3 is illustrated in FIG. 4. The polymeric resin is preferably retained in a pressurized day tank 40 having a mixer 42. The dry nucleation gas is retained in its own tank 44 and is introduced into the polymeric resin contained within day tank 40. In one embodiment, the gas may be introduced into the polymeric resin by a sparging tube 46 contained in the day tank 40 until the proper specific gravity is achieved. The nucleation recirculation pump 48 continues pumping the polymeric resin and dry gas air bubbles through the fine porosity stone mixer 50 which further breaks the bubbles down to achieve the proper cell size distribution and to maintain the proper specific gravity.

As previously described with reference to FIG. 3, other methods of nucleation may also produce favorable results. For example, placing an emulsifying pump 52 after the fine porosity stone mixer can achieve an even smaller cell size distribution in the pad. Moreover, placing a homogenizing mixer 54 after an even finer porosity stone mixer can achieve a still finer cell size distribution.

The mixer 42 in the pressurized day tank 40 continues to mix the nucleated polymeric resin to assure uniformity of the polymeric resin materials. A second pressurized day tank 56 having a mixer 58 is used to retain the isocyanate component. The polymeric resin materials are allowed to come to temperature by the heated water circulating in the jacketed day tanks.

A high pressure mix head 60 is bolted to an actuated mold 62 after any necessary port changes or calibration steps. The pour time, press angle, and press timing sequences are set for the mold and tables are arranged to to support the storage requirements for the pads to be produced. The polymeric resin and gas are mixed with the isocyanate in the mixhead 60 and then injected into the mold 62 through a mix nozzle. The mold press actuates the mold which has the ability to rotate prior to the liquid injection so that it can eliminate air pockets.

An operator opens mold 62, sprays it with a mold release, closes the mold, and rotates the mold to its shot angle. The polymeric resin, gas and isocyanate mixture is shot into the mold using the pre-programmed pour time. Two high-pressure positive displacement pumps 64 and 66 continuously circulate the isocyanate, and polymeric resin and gas, through mixhead 60 and back into their day tanks 56 and 40, respectively. The shot of polymeric resin, gas and isocyanate into mold 62 is accomplished by a hydraulic system 68 activating a valve within mixhead 60 which changes the material flow from the recirculation mode to the impingement (or dispense) mode. The polymeric resin and gas, and isocyanate liquids are shot at each other under extremely high velocities thereby thoroughly mixing the two components which then exit mixhead 60 and enter mold 62. At the end of the shot time, hydraulic system 68 shuts the valve off which also pushes all of the remaining polymeric resin, gas, and isocyanate liquid out of mixhead 60.

Mold 62 remains at the altitude it was rotated to for injection for about two minutes. Mold 62 then slowly rotates to its flat starting position. After about one more minute, mold 62 automatically opens and an operator removes the pad from the mold and the cycle then repeats itself. The removed pads are staged on a flat surface and allowed to stabilize for a minimum of one hour to prevent warping.

The mixture in the mold sets without the use of an oven. After the pad is removed from the mold and set, it may be ground or faced on one or both sides as previously described with reference to FIG. 3. The polishing pad of the present invention does not include multiple layers but instead forms a single homogenous layer.

The following is an example of a polishing pad produced in accordance with the exemplary method shown and described with reference to FIGS. 3 and 4:

EXAMPLE 1

The apparatus as described in the attached FIGS. 3 and 4 was used in conjunction with an unaltered elastomeric polyurethane system supplied by Bayer, namely Bayflex XGT-140 which comprises a two component system. The equipment used was a 500 pound/min cylinder machine. The standard urethane supplier recommended process parameters were utilized for this example and include:

| | |
|---|---|
| Material Temperature | 90–100 F. |
| Mold Temperature | 140–158 F. |
| Polyol Nucleation | 0.75–0.80 |
| Maximum Shot Time | 11–12 sec |
| Typical Demold Time | 2–3 min |
| Iso/Polyol Volume Mixing Ration | 137:100 |

A closed cellular structured Polishing Pad was fabricated with the techniques and process guidelines as described. The average cell size for the polishing pad was 20 micrometers. Concentric grooves, 30 mil in depth, 62.5 mil wide with a radial density of eight grooves per inch were machined into the polishing surface. The pad was laminated with 3M 442KW double side adhesive and installed on a commercially available IPEC 472 polishing machine. Silicon wafers, 8" in diameter, with thick thermally grown oxides on the surface, were polished using a commercially available silica-based oxide slurry from Rodel (Klebesol 1501-50). Typical process parameters and break-in procedures were employed, as shown below:

| | |
|---|---|
| Polishing Film | Thermally grown Silicon Dioxide on 8" Silicon Substrates |
| Polishing Machine | IPEC 472 |
| Process Table Speed | 110 RPM |
| Process Carrier Down Pressure | 5 PSI |
| Process Carrier Speed | 55 RPM |
| Polishing Slurry | Rodel Klebesol 1501-50 |
| Slurry Flow Rate | 150 ml/min |
| Polishing Time | 2 min |
| Conditioner | TBW |
| Conditioning | Ex-situ |

Break-in consisted of three oxide dummy wafers prior to polishing of the three oxide monitor wafers. Pre and post-polish oxide thickness measurements were conducted using standard wafer scale dielectric thickness metrology tools, measurement recipes, measurement site locations and film material parameters.

Figure 5:
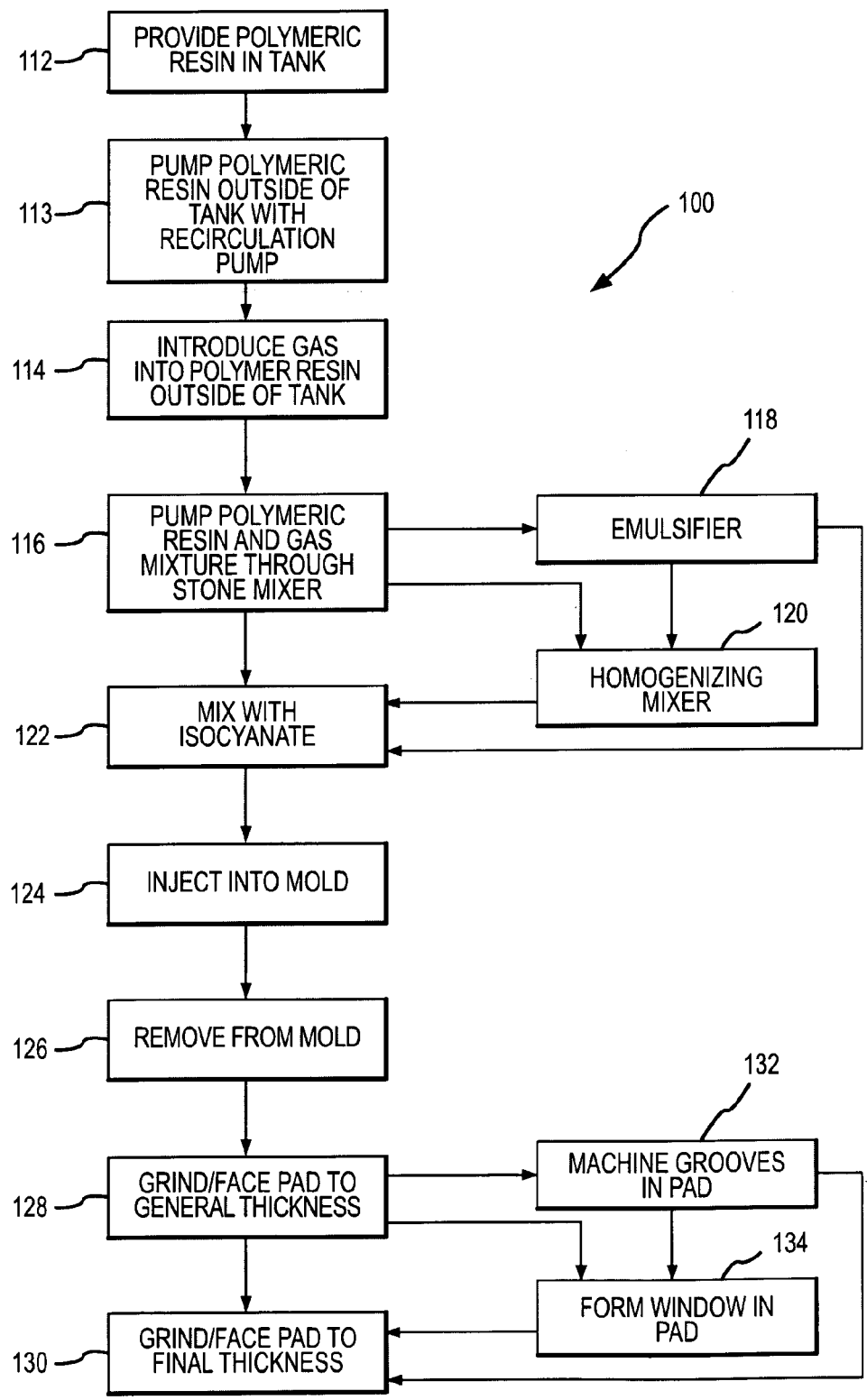
FIG. 5 is a flowchart showing another exemplary embodiment of the method for making the polishing pad of the present invention.

The wafer average removal rates were determined as follow:
1. 2159 A/min
2. 2149 A/min
3. 2147 A/min Turning now to FIG. 5, a flowchart showing another exemplary embodiment of the method 100 for making the polishing pad of the present invention is shown. The method shown in FIG. 5 is nearly identical to the method shown in FIG. 3 with the exception of the first couple of steps in the method. In step 112, the polymeric resin containing the catalyst is retained in a day tank having a mixer and in step 113, the polymeric resin material is pumped out of its day tank and through a recirculation tank. The gas is then introduced into the polymeric resin in step 114 outside of the day tank. Next, the polymeric resin and gas mixture is pumped through a fine porosity stone mixer in step 116. The steps in this exemplary embodiment then track identically with the steps outlined in the exemplary embodiment shown in FIG. 3 and are herein incorporate again by reference.

Figure 6:
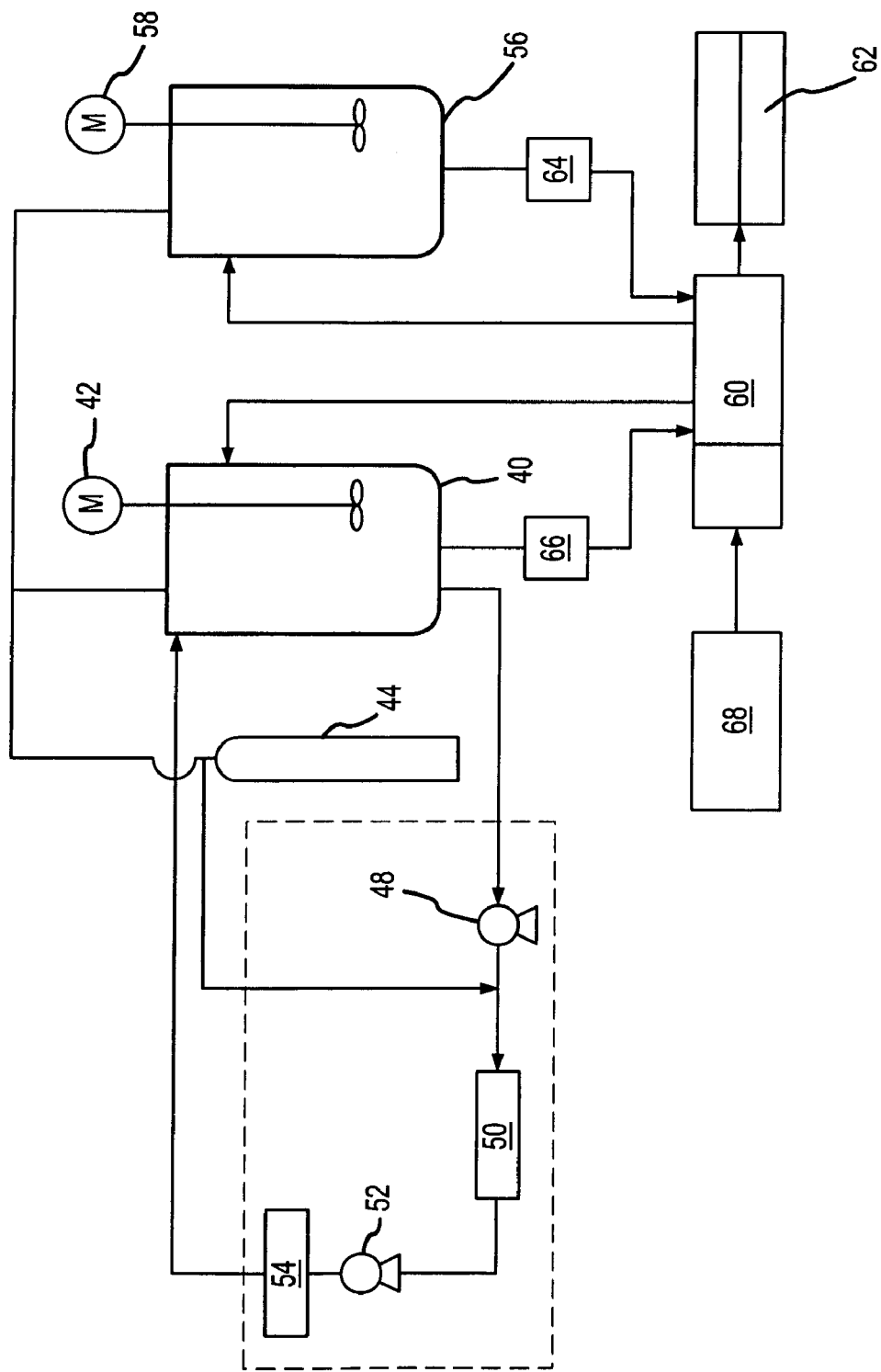
FIG. 6 is a schematic view of the manufacturing equipment used to produce the polishing pad in accordance with the method shown in FIG. 5.

In the embodiment shown in FIG. 5, the gas may be injected directly into the recirculation pump which thereby eliminates any need for a sparging tube. FIG. 6 is a schematic view of the manufacturing equipment used to produce the polishing pad in accordance with the method shown in FIG. 5. As can be seen in FIG. 6, the manufacturing equipment is almost identical to the schematic of the manufacturing equipment shown in FIG. 4 with the following exceptions: 1) There is no sparging tube contained in day tank 40 where the polymeric resin is retained, and 2) the gas is introduced into the polymeric resin either through recirculation pump 48 or after the polymeric resin is pumped through recirculation pump 48. Accordingly, the detailed description relating to the identical equipment shown in FIG. 4 is herein incorporated again by reference.

Figure 7:
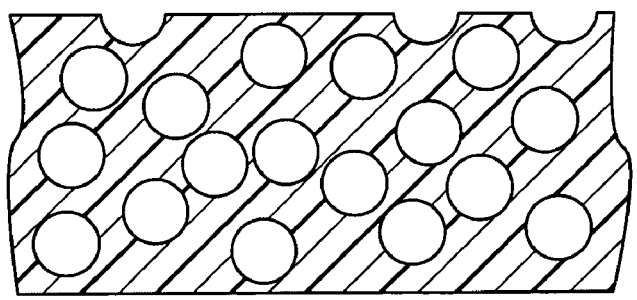
FIG. 7 is an enlarged plan view illustrating the surface of the polishing pad of the present invention.

FIG. 7 is an enlarged plan view illustrating the surface of the polishing pad of the present invention. The imported gas bubbles can range in average diameter from about 0.05 microns to 100 microns, and preferably from about 0.05 microns to 30 microns, with correspondingly tight distributions depending on the specific process parameters. Various diameters of holes or openings are observed on the surface of the cut pad material where the bubbles have been opened. Flat land areas make up the surrounding polyurethane pad material and are located between the opened bubbles. The polishing pad of the present invention has some ability to absorb/transport slurry due to the open cells at the pad surface but the remaining structure of the pad comprises a closed cell structure and is considered to be nonporous. The dimension of the cells or microspheres is controlled through the use of shear inducing process equipment including sparging tubes, emulsifying mixers, and the like prior to mixing the reactive components and injecting them into the mold. The isocyanate material is fully reacted in the mold to prevent any post manufacturing curing. It will be appreciated by those skilled in the art that the terms bubbles, cells, microspheres, microcells, and micropores are all being used interchangeably in describing the present invention.

The polishing pad of the present invention is designed to undergo periodic or continual surface regeneration. The regeneration involves removing the old surface and exposing a like new surface and the design of the polishing pad allows for a completely new surface to be exposed with pad wear approximately equal to the size of the maximum cell size. Because the polishing pad of the present invention can produce smaller, more uniform cell sizes, its surface regeneration can occur several times more than in similar products.

The present invention provides polishing pads that are suitable for CMP. Polishing pads of the present invention make possible effective removal of material layers, including those used in microelectronic devices as discussed above, in a minimum number of steps while assuring good process capability (including planarity and defectivity), process stability and process manufacturability.

The polishing pad of the present invention may also include additional hardware, such as hardware for assisting in endpoint detection, that is incorporated into the pad during the molding process. More particularly, one or more pieces of hardware are fixed into place within the mold and the polymeric resin and gas mixture and isocyanate are then injected into the mold so that they effectively encompass the hardware. Alternatively, a separate post molding step takes place in which a portion of the pad is machined away so that the hardware can be introduced and fixed into place.

A further aspect of the present invention relates to a method for polishing or planarizing a substrate which comprises contacting the substrate with the above disclosed polishing pad and polishing or planarizing the substrate by chemical-mechanical polishing.

A further aspect of the present invention relates to a method for manufacturing a polishing pad which comprises reactive injection molding technology using micropores created through direct gas injection.

A still further aspect of the present invention relates to a method for fabricating semiconductor integrated circuits comprising forming circuits on the surface of a semiconductor wafer by photolithographic and plating processes, polishing or planarizing the circuitry by contacting the semiconductor wafer with the above disclosed polishing pad in the presence of a polishing liquid and planarizing the circuitry by chemical-mechanical polishing.

The foregoing description of the invention illustrates and describes the present invention. Additionally, the disclosure shows and describes only the preferred embodiments of the invention but, as mentioned above, it is to be understood that the invention is capable of use in various other combinations, modifications, and environments and is capable of changes or modifications within the scope of the inventive concept as expressed herein commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. A method for making a nonporous polishing pad of uniform microcellular size comprising the steps of:
   providing a polymeric resin contained in a pressurized tank having a mixer;
   introducing a gas into the polymeric resin;
   pumping the polymeric resin and gas mixture through a fine porosity stone mixer;
   pumping the polymeric resin and gas mixture through an emulsifier;
   mixing an isocyanate into the polymeric resin and gas mixture to form a resulting mixture; and
   injecting the resulting mixture into a mold.

2. A method for making a nonporous polishing pad of uniform microcellular size comprising the steps of:
   providing a polymeric resin contained in a pressurized tank having a mixer;
   introducing a gas into the polymeric resin through a recirculating pump contained outside of the pressurized tank;
   pumping the polymeric resin and gas mixture through a fine porosity stone mixer with the recirculating pump;
   pumping the polymeric resin and gas mixture through an emulsifier;
   mixing an isocyanate into the polymeric resin and gas mixture to form a resulting mixture; and
   injecting the resulting mixture into a mold.

3. The method of claim 2 further comprising the steps of:
   removing a formed pad from the mold; and
   grinding or facing at least one side of the pad to a desired thickness.

4. The method of claim 2 further comprising the step of machining grooves into a surface of the pad.

5. The method of claim 2 further comprising the step of forming a window in the pad.

6. The method of claim 5 wherein said window is formed by removing a portion of the pad and filling an opening created by the removed portion with a liquid polyurethane material that solidifies as a transparent or translucent portion of the pad.

7. The method of claim 5 wherein said window is formed by removing a portion of the pad and filling an opening created by the removed portion with a solid transparent portion or translucent portion that is bonded to the pad.

8. The method of claim 2 wherein the mold is an actuated mold which undergoes a reaction injection molding process.

9. The method of claim 2 wherein an average cell size of the pad is controlled by applying a plurality of shearing forces to the polymeric resin and gas mixture prior to adding the catalyst.

10. A method for making a nonporous polishing pad of uniform microcellular size comprising the steps of:
    providing a polymeric resin contained in a pressurized tank having a mixer;
    introducing a gas into the polymeric resin;
    pumping the polymeric resin and gas mixture through a fine porosity stone mixer;
    passing the polymeric resin and gas mixture through a homogenizing mixer;
    mixing an isocyanate into the polymeric resin and gas mixture to form a resulting mixture; and
    injecting the resulting mixture into a mold.

11. A method for making a nonporous polishing pad of uniform microcellular size comprising the steps of:
    providing a polymeric resin contained in a pressurized tank having a mixer;
    introducing a gas into the polymeric resin through a sparging tube contained in within the pressurized tank;
    pumping the polymeric resin and gas mixture through a fine porosity stone mixer;
    mixing an isocyanate into the polymeric resin and gas mixture to form a resulting mixture; and
    injecting the resulting mixture into a mold.

12. The method of claim 11 further comprising the step of pumping the polymeric resin and gas mixture through an emulsifier after the step of pumping the polymeric resin and gas mixture through a fine porosity stone mixer.

13. The method of claim 11 further comprising the step of passing the polymeric resin and gas mixture through a homogenizing mixer after the step of pumping the polymeric resin and gas mixture through a fine porosity stone mixer.

14. The method of claim 11 further comprising the steps of:
removing a formed pad from the mold; and
grinding or facing at least one side of the pad to a desired thickness.

15. The method of claim 11 further comprising the step of machining grooves into a surface of the pad.

16. The method of claim 11 further comprising the step of forming a window in the pad.

17. The method of claim 16 wherein said window is formed by removing a portion of the pad and filling an opening created by the removed portion with a liquid polyurethane material that solidifies as a transparent portion or translucent portion of the pad.

18. The method of claim 16 wherein said window is formed by removing a portion of the pad and filling an opening created by the removed portion with a solid transparent portion or translucent portion that is bonded to the pad.

19. The method of claim 11 wherein the mold is an actuated mold which undergoes a reaction injection molding process.

20. The method of claim 11 wherein an average cell size of the pad is controlled by applying a plurality of shearing forces to the polymeric resin and gas mixture prior to adding the isocyanate.

21. The method of claim 20 further comprising the step of directing the polymeric resin and gas mixture through a high shear cavitation device prior to adding the isocyanate prior to adding the isocyanate.

22. The method of claim 20 further comprising the step of incorporating hardware into the polishing pad during the molding process, or after the molding process by machining away a portion of the pad.

23. The method of claim 11 further comprising the step of incorporating hardware into the polishing pad during the molding process, or after the molding process by machining away a portion of the pad.

24. A method for making a nonporous polishing pad of uniform microcellular size comprising the steps of:
providing a polymeric resin contained in a pressurized tank having a mixer;
introducing a gas into the polymeric resin;
pumping the polymeric resin and gas mixture through a fine porosity stone mixer;
directing the polymeric resin and gas mixture through a high shear cavitation device;
mixing an isocyanate into the polymeric resin and gas mixture to form a resulting mixture; and
injecting the resulting mixture into a mold.

25. A method for making a nonporous polishing pad of uniform microcellular size comprising the steps of:
providing a polymeric resin contained in a pressurized tank having a mixer;
introducing a gas into the polymeric resin through a recirculating pump contained outside of the pressurized tank;
pumping the polymeric resin and gas mixture through a fine porosity stone mixer with the recirculating pump;
passing the polymeric resin and gas mixture through a homogenizing mixer;
mixing an isocyanate into the polymeric resin and gas mixture to form a resulting mixture; and
injecting the resulting mixture into a mold.

26. The method of claim 25 further comprising the steps of:
removing a formed pad from the mold; and
grinding or facing at least one side of the pad to a desired thickness.

27. The method of claim 25 further comprising the step of machining grooves into a surface of the pad.

28. The method of claim 25 further comprising the step of forming a window in the pad.

29. The method of claim 28 wherein said window is formed by removing a portion of the pad and filling an opening created by the removed portion with a liquid polyurethane material that solidifies as a transparent or translucent portion of the pad.

30. The method of claim 28 wherein said window is formed by removing a portion of the pad and filling an opening created by the removed portion with a solid transparent portion or translucent portion that is bonded to the pad.

31. The method of claim 25 wherein the mold is an actuated mold which undergoes a reaction injection molding process.

32. The method of claim 25 wherein an average cell size of the pad is controlled by applying a plurality of shearing forces to the polymeric resin and gas mixture prior to adding the catalyst.

* * * * *